(12) United States Patent
Ahn et al.

(10) Patent No.: US 10,383,109 B2
(45) Date of Patent: Aug. 13, 2019

(54) METHOD FOR RECEIVING DATA IN UNLICENSED BAND AND DEVICE USING SAME

(71) Applicant: LG ELECTRONICS INC., Seoul (KR)

(72) Inventors: Joonkui Ahn, Seoul (KR); Hanbyul Seo, Seoul (KR); Seungmin Lee, Seoul (KR); Yunjung Yi, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 15/557,425

(22) PCT Filed: Mar. 11, 2016

(86) PCT No.: PCT/KR2016/002438
§ 371 (c)(1),
(2) Date: Sep. 11, 2017

(87) PCT Pub. No.: WO2016/144129
PCT Pub. Date: Sep. 15, 2016

(65) Prior Publication Data
US 2018/0115967 A1    Apr. 26, 2018

Related U.S. Application Data

(60) Provisional application No. 62/138,396, filed on Mar. 26, 2015, provisional application No. 62/131,845, filed on Mar. 12, 2015.

(51) Int. Cl.
*H04W 72/04* (2009.01)
*H04W 48/16* (2009.01)
(Continued)

(52) U.S. Cl.
CPC ........ *H04W 72/044* (2013.01); *H04B 7/2656* (2013.01); *H04L 5/00* (2013.01);
(Continued)

(58) Field of Classification Search
CPC . H04W 72/044; H04W 48/16; H04W 56/001; H04W 72/042; H04W 56/0015; H04B 7/2656; H04L 5/00
See application file for complete search history.

(56) References Cited

U.S. PATENT DOCUMENTS

2006/0264180 A1*  11/2006  Qiu ................... H04L 1/0003
                                                   455/69
2012/0287800 A1*  11/2012  Siomina ............ H04W 64/003
                                                   370/252

(Continued)

OTHER PUBLICATIONS

PCT International Application No. PCT/KR2016/002438, International Search Report dated Jun. 17, 2016, 2 pages.

(Continued)

*Primary Examiner* — Ajay Cattungal
(74) *Attorney, Agent, or Firm* — Lee, Hong, Degerman, Kang & Waimey (57) ABSTRACT

A method for receiving data in an unlicensed band and a device using the same are provided. The device receives discovery reference signal (DRS) configuration for a DRS period from a primary cell operating in a licensed band, and checks the reception of the DRS in a DRS subframe of a secondary cell operating in the unlicensed band according to the DRS period. When the DRS is received in the DRS subframe, the device determines the reception quality of a downlink data burst on the basis of the received DRS.

9 Claims, 11 Drawing Sheets

(51) Int. Cl.
*H04W 56/00* (2009.01)
*H04B 7/26* (2006.01)
*H04L 5/00* (2006.01)

(52) U.S. Cl.
CPC ......... *H04W 48/16* (2013.01); *H04W 56/001* (2013.01); *H04W 56/0015* (2013.01); *H04W 72/042* (2013.01)

(56) References Cited

U.S. PATENT DOCUMENTS

| | | |
|---|---|---|
| 2014/0036853 A1 | 2/2014 | Kim et al. |
| 2014/0036881 A1 | 2/2014 | Kim et al. |
| 2014/0050206 A1 | 2/2014 | Seo et al. |
| 2014/0334320 A1 | 11/2014 | Liu et al. |
| 2015/0208269 A1* | 7/2015 | Damnjanovic ....... H04L 1/0026 370/252 |
| 2015/0215929 A1* | 7/2015 | Damnjanovic ......... H04L 5/001 370/241 |
| 2015/0271744 A1* | 9/2015 | Liu ........................ H04L 5/005 370/329 |
| 2016/0234762 A1* | 8/2016 | You ...................... H04J 11/0056 |
| 2017/0048041 A1* | 2/2017 | Yi ......................... H04L 5/0048 |
| 2017/0048917 A1* | 2/2017 | Kim ..................... H04L 5/0048 |

OTHER PUBLICATIONS

Intel Corporation, "DRS Design Options for LAA Downlink", R1-150506, 3GPP TSG RAN WG1 Meeting #80, Feb. 2015, 3 pages.

\* cited by examiner

Special subframe, configuration 1, 2, 6 or 7

Special subframe, configuration 3, 4, 8 or 9

All other downlink subframe

METHOD FOR RECEIVING DATA IN UNLICENSED BAND AND DEVICE USING SAME

CROSS-REFERENCE TO RELATED APPLICATIONS

This application is the National Stage filing under 35 U.S.C. 371 of International Application No. PCT/KR2016/002438, filed on Mar. 11, 2016, which claims the benefit of U.S. Provisional Application Nos. 62/131,845, filed on Mar. 12, 2015 and 62/138,396, filed on Mar. 26, 2015, the contents of which are all hereby incorporated by reference herein in their entirety.

BACKGROUND OF THE INVENTION

Field of the Invention

The present invention relates to wireless communication, and more particularly, to a method of receiving data in an unlicensed band and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method for receiving data in an unlicensed band and a device using the same.

In an aspect, a method of receiving data in an unlicensed band including receiving, by a wireless device, a discovery reference signal (DRS) configuration for a DRS period from a primary cell operating in a licensed band, confirming, by the wireless device, whether a DRS is received in a DRS subframe of a secondary cell operating in the unlicensed band according to the DRS period, receiving, by the wireless device, a downlink data burst from the secondary cell, and determining, by the wireless device, a reception quality of the downlink data burst based on the received DRS when the DRS is received in the DRS subframe.

In another aspect, a device for receiving data in an unlicensed band includes a transceiver for transmitting and receiving a radio signal, and a processor operatively coupled to the transceiver. The processor is configured to receive, via the transceiver, a discovery reference signal (DRS) configuration for a DRS period from a primary cell operating in a licensed band, confirm whether a DRS is received in a DRS subframe of a secondary cell operating in the unlicensed band according to the DRS period, receive, via the transceiver, a downlink data burst from the secondary cell, and determine a reception quality of the downlink data burst based on the received DRS when the DRS is received in the DRS subframe.

In an environment where various communication protocols co-exist in an unlicensed band, deteriorating data reception quality can be prevented.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
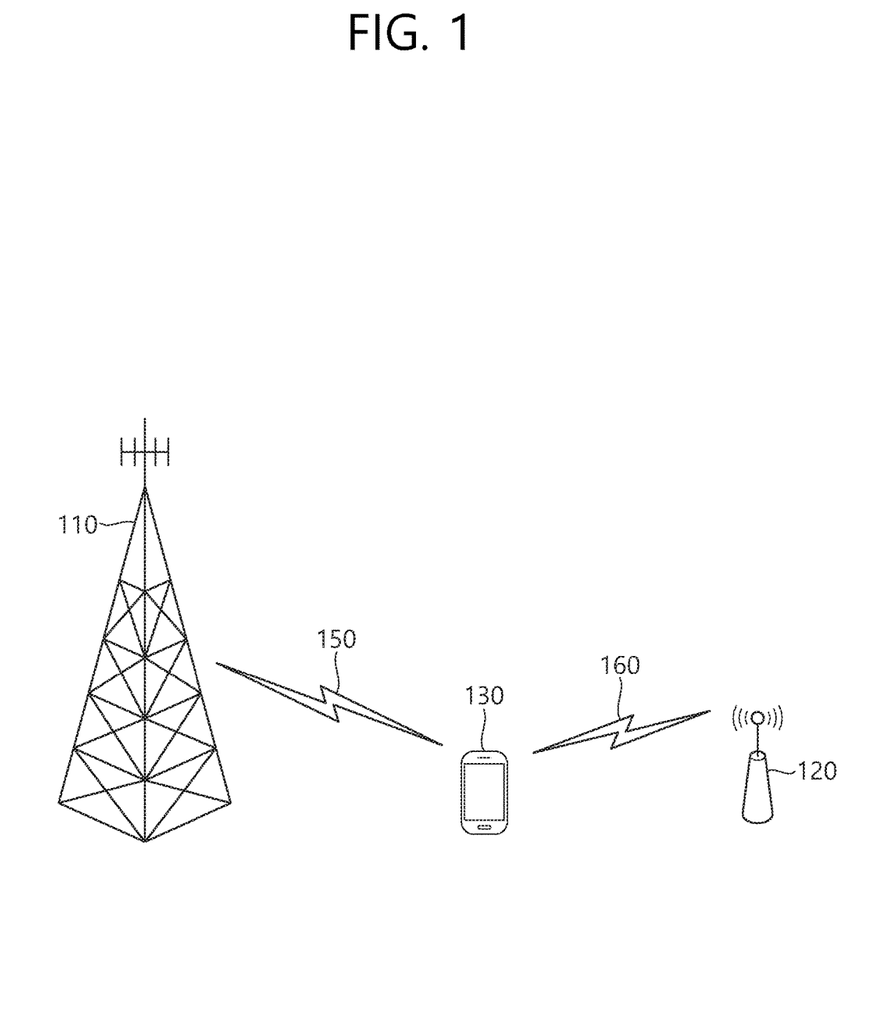
FIG. 1 shows an example of a long term evolution (LTE) service using an unlicensed band.

FIG. 1 shows an example of an LTE service using an unlicensed band.

A wireless device 130 establishes a connection with a 1st BS 110, and receives a service through a licensed band. For traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Hereinafter, a cell (or a carrier) operating in an unlicensed band is called an unlicensed cell or an unlicensed carrier. A cell operating in a licensed band is called a licensed cell or a licensed carrier.

An LBT operation in an unlicensed band is regulated in some countries. For example, in Europe, there are two types of LBT operations which are named as frame based equipment (FBE) and load based equipment (LBE).

Figure 2:
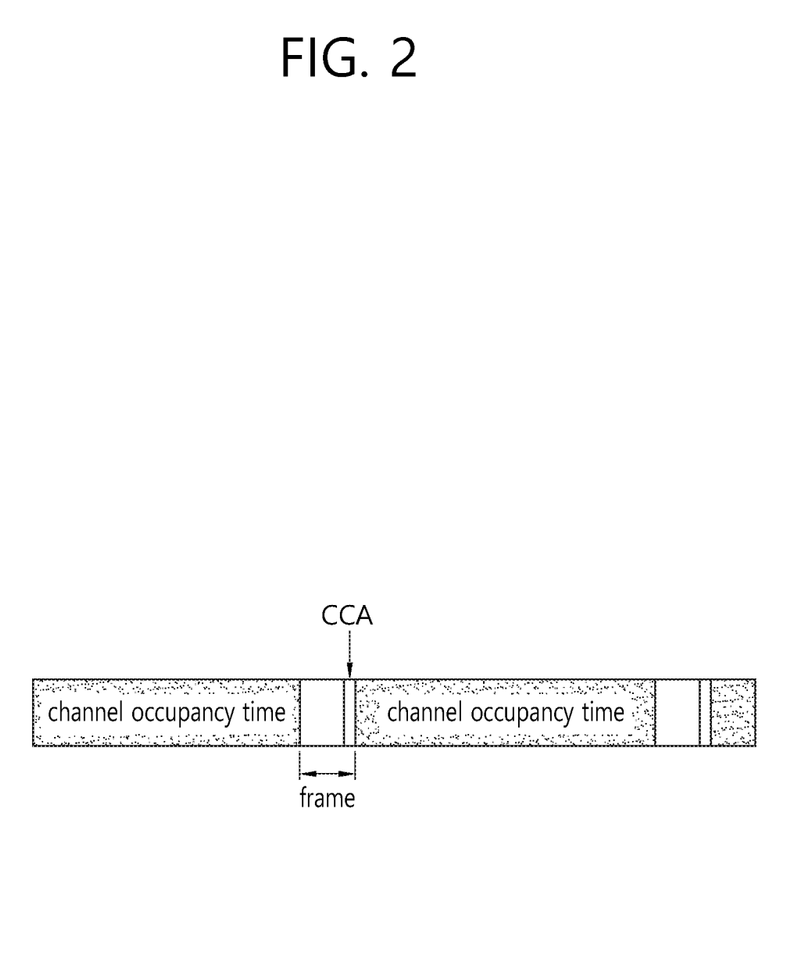
FIG. 2 shows an example of a frame based equipment (FBE)-based listen before talk (LBT) operation.

FIG. 2 shows an example of an FBE-based LBT operation.

A channel occupancy time implies a time during which transmission can be continued when a communication node successfully accesses a channel, and has a value of about 1 ms to 10 ms. A frame is an idle time corresponding to at least 5% of the channel occupancy time. CCA is defined as an operation of observing the channel during at least 20 μs before an end portion within the idle time. The communication node periodically performs the CCA in unit of the frame, and transmits data during a next channel occupancy time in a state where the channel is not occupied. The communication node defers transmission in a state where the channel is occupied, and waits until a next frame.

The FBE-based LBT operation implies that a channel occupancy time and a channel detection time are predefined, and CCA is performed only at a determined channel detection time, and may be called a fixed CCA execution method.

Figure 3:
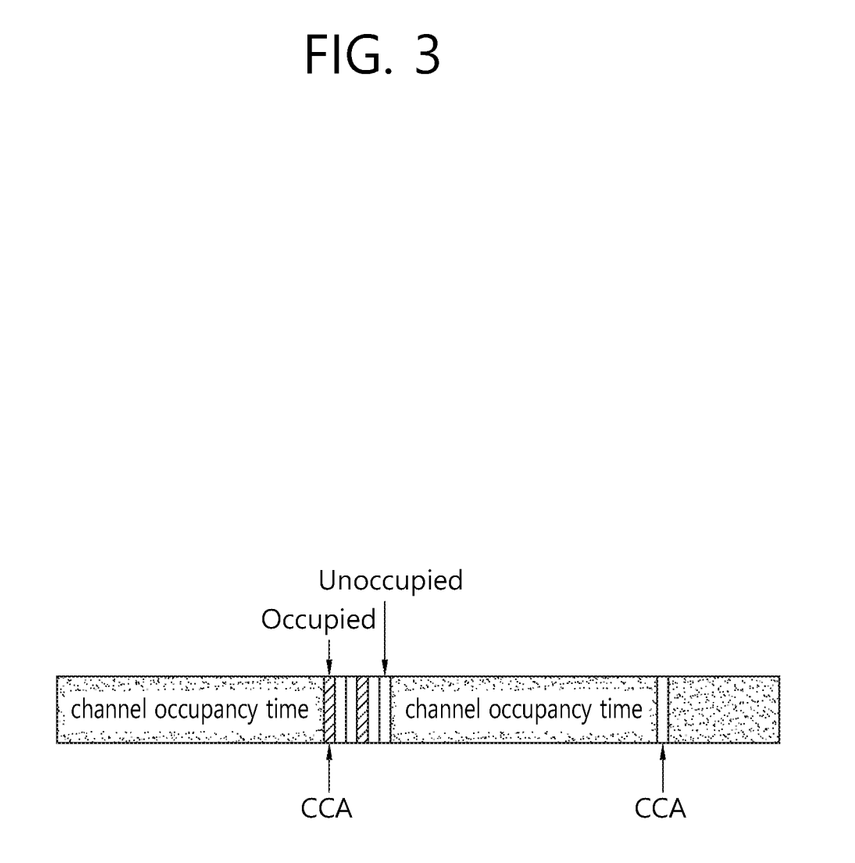
FIG. 3 shows an example of a load based equipment (LBE)-based LBT operation.

FIG. 3 shows an example of an LBE-based LBT operation.

An idle time is defined between channel occupancy times. The idle time is divided into a plurality of slots. A communication node may first set a value of q∈{4, 5, , 32} and thereafter perform CCA for one slot, and if a channel is in an unoccupied state in the CCA slot, may transmit data by ensuring a channel occupancy time having a length of ($13/32$)q ms. If the channel is in an occupied state in the first CCA slot, the communication node randomly chooses a value of N∈{1, 2, . . . , q} and stores it as an initial value of a backoff counter.

Thereafter, if the channel is in the unoccupied state in one CA slot while sensing a channel state in unit of the CCA slot, a value of the backoff counter is decreased by 1. If the value of the backoff counter becomes 0, the communication node may transmit data during the channel occupancy time having the length of ($13/32$)q ms.

The LBE-based LBT operation implies that the communication node performs the CCA by randomly determining a channel detection time (e.g., the CCA slot) according to whether the channel is occupied, and may be called a random CCA execution method.

Hereinafter, a parameter for selecting an LBT method and determining a backoff length, a parameter for determining a size of a CCA slot, and a parameter used for an LBT operation such as a period and time offset for determining CCA timing are called an LBT parameter. A unit of signals transmitted by a radio node through an LBT operation performed one time is called a transmission burst.

Hereinafter, a method in which a first type signal is used in time-frequency synchronization/demodulation for a second type signal and in automatic gain control (AGC) setting required for this is proposed when a receiving node receives different types of signals from a transmitting node in an unlicensed band. For convenience, the receiving node is called a UE, and the transmitting node is called a BS. The first type signal is called a DL signal, and the second type signal is called a UL signal.

A discovery reference signal (DRS) may be used as an example of the first type signal, and a DL data burst may be used as an example of the second type signal. The DRS is a signal periodically transmitted for radio resource measurement (RRM) of the UE. The DL data burst may be a signal which carries traffic data transmitted intermittently to the UE or extra information in addition to the DRS.

Figure 4:
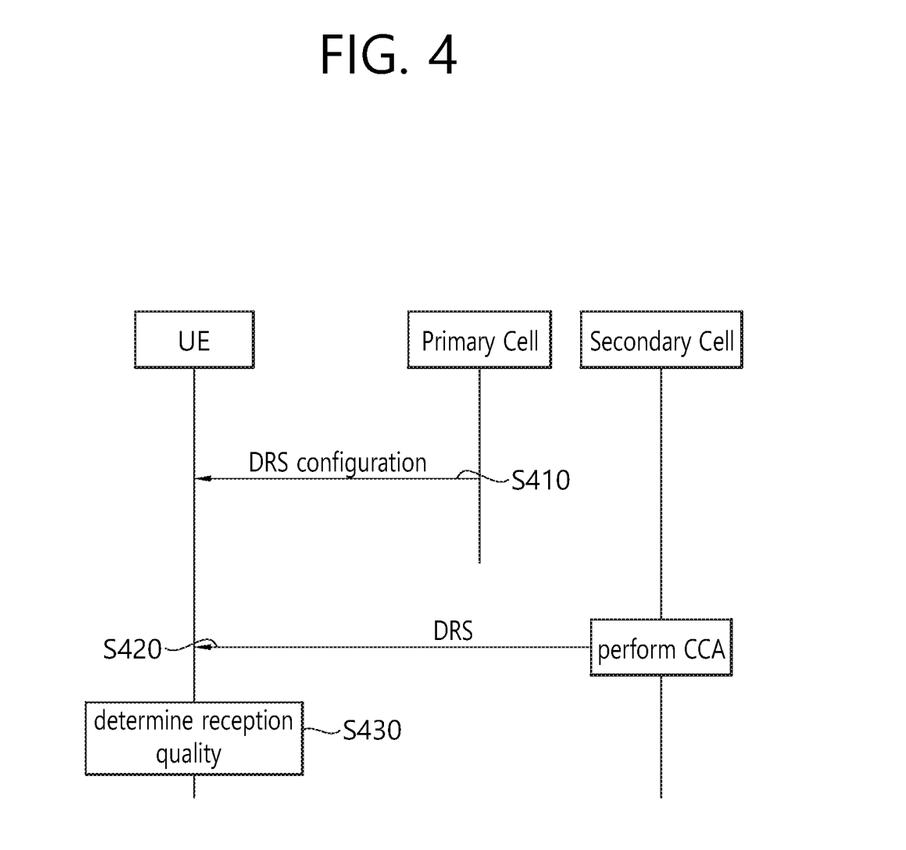
FIG. 4 shows a communication method in an unlicensed band according to an embodiment of the present invention.

FIG. 4 shows a communication method in an unlicensed band according to an embodiment of the present invention.

A primary cell is called a cell of a licensed band, and a secondary cell is called a cell of an unlicensed band. The number of cells is for exemplary purposes only.

In step S410, in the primary cell, a UE receives a DRS configuration for the secondary cell. The DRS configuration may include information regarding a DRS period at which a DRS is transmitted. The DRS configuration may further include information regarding a channel on which the DRS is transmitted, a structure of the DRS, an LBT method for the DRS, and/or a subframe structure in which the DRS is transmitted. The DRS configuration may be included in an RRC message.

In step S420, the secondary cell performs CCA with the DRS period, and transmits the DRS when a channel is idle.

Figure 5:
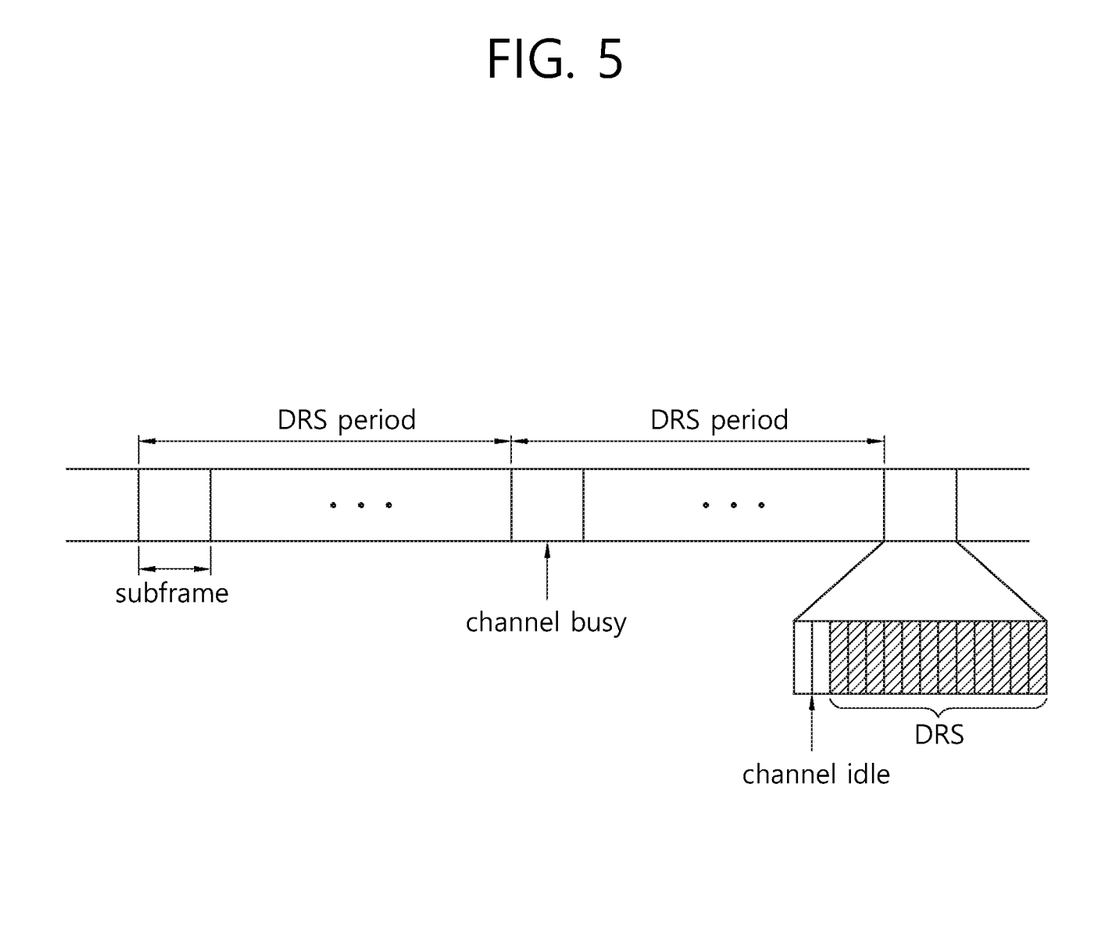
FIG. 5 shows an example of discovery reference signal (DRS) transmission.

FIG. 5 shows an example of DRS transmission.

It is assumed that a DRS is transmitted during one subframe in each DRS period. A subframe in which the DRS is transmitted is called a DRS subframe. The subframe may include 14 orthogonal frequency division multiplexing (OFDM) symbols.

A secondary cell performs CCA in each DRS subframe to confirm a channel state. For example, the DRS is not transmitted in a first DRS subframe 510 since a channel is busy. The DRS is transmitted in a second DRS subframe 520 since the channel is idle. The CCA may be performed in first two OFDM symbols of the DRS subframe 520, and the DRS may be transmitted in the remaining 12 OFDM symbols. This is for exemplary purposes only, and thus the CCA may be performed in one or more OFDM symbols of the DRS subframe.

Referring back to FIG. 4, in step S430, the UE acquires a time-frequency synchronization through the received DRS, and utilizes this for reception quality of a DL data burst.

The UE may acquire the time-frequency synchronization discontinuously through the DRS, and may utilize this as additional information for acquiring the time-frequency synchronization required to receive the DL data burst. For this, the UE needs to receive the DRS within a specific time of receiving the DL data burst. This is because required data burst reception performance can be obtained since the time-frequency synchronization is not significantly changed between a DRS reception time and a DL data burst reception time. In addition, the DRS may be utilized to acquire a time-frequency synchronization for DL data burst reception when the DRS and the DL data burst are received through the same frequency region or antenna port or when they are received while conforming to a determined time synchronization. The UE may autonomously determine whether the DRS is utilized as a time-frequency synchronization source. Alternatively, a BS may inform the UE of whether the DRS can be utilized.

When the UE receives the DRS within a specific time duration T before the DL data burst is received, the time-frequency synchronization acquired through the DRS may be utilized in reception of the DL data burst. Reception quality of the DL data burst may be a block error rate (BLER). For example, if the DRS is received within the specific time duration T, a target BLER of the DL data burst may be decreased, and if the DRS is not received within the specific time duration T, the target BLER of the DL data burst may be increased.

Alternatively, the UE may differentiate reception quality of the DL data burst which must be acquired by the UE for a case where the DRS is received within the specific time duration T and for an opposite case. According to an interval between a time of receiving a data burst and a time of finally receiving a DRS, a duration length of the received DRS, the number of received DRSs, and reception quality of the DRS (receive power, signal-to-interference-plus-noise ratio (SINR), etc.), the UE may differentiate reception quality of the DL data burst or may determine whether to utilize the DRS to acquire the time-frequency synchronization.

A network may inform the UE of flag information regarding whether the time-frequency synchronization acquired through the DRS can be utilized to receive the data burst in advance through RRC signaling or MAC signaling. The flag information may be included in a DRS configuration.

The UE may apply an AGC gain configured through the DRS according to the flag information to receive the DL data burst. In order to apply the same or similar AGC gain to the DRS and the data burst, the BS may adjust transmit power between the DRS and the data burst within a specific power difference. The UE may assume that receive power between the DRS and the data burst is identical or reception is achieved within a specific power difference. The UE may utilize the AGC gain obtained through the DRS to receive the data burst only when the aforementioned condition is satisfied. In practice, since it is difficult for the UE to determine a receive power level of a reception signal before the AGC gain is configured, this method may be applied from a perspective of average receive power.

Although an example of utilizing the DRS to receive the data burst is shown in the aforementioned embodiments, this is for exemplary purposes only. The aforementioned embodiment may be applied to identical or different types of signals to share the time-frequency synchronization and the AGC gain configuration.

In the unlicensed band, if the BS performs the CCA and transmits the DRS when a channel is not occupied, another communication node which detects DRS transmission stops having access to the channel. Therefore, the UE may detect the DRS with relatively good reception quality. However, if the BS does not perform the CCA before DRS transmission in the unlicensed band, DRS reception quality may deteriorate due to interference from other radio nodes. Therefore, it is proposed to differentiate a length and the number of DRS durations of which an average is taken by the UE for DRS reception detection and unit RRM (RSRP, RSRQ, RSSI, etc.) measurement according to whether the CCA is applied in DRS transmission. For example, if the CCA is applied, measurement may be performed for each DRS duration by taking a reception signal average for RRM measurement in a single DRS duration in which a single CCA operation is used for transmission. If the CCA is not applied, measurement may be performed to take an average for a plurality of DRS durations in which transmission is achieved at a discontinuous time. Since the UE cannot know whether the BS applies the CCA to DRS transmission, the BS may inform the UE of the length and number of DRS durations, of which an average can be taken for measurement, and a time window through RRC signaling or MAC signaling.

Now, a method for avoiding deterioration in reception performance is proposed when CCA is performed in an unlicensed band.

If a transmitting node transmits a data burst intermittently only when data transmission is necessary in the unlicensed band, a receiving node needs to perform a time-frequency synchronization and AGC setting very rapidly to demodulate a signal of which reception starts instantaneously without any preparation operation. In particular, if the AGC setting is not achieved very rapidly, a starting part of the reception signal is not amplified/converted with a proper level, and thus proper reception performance may not be guaranteed. In 3GPP LTE, a DL control channel (e.g., physical downlink control channel (PDCCH), etc.) is transmitted from a $1^{st}$ OFDM symbol of a subframe, and DL control signal reception may have a significant problem according to capability of the receiving node.

Figure 6:
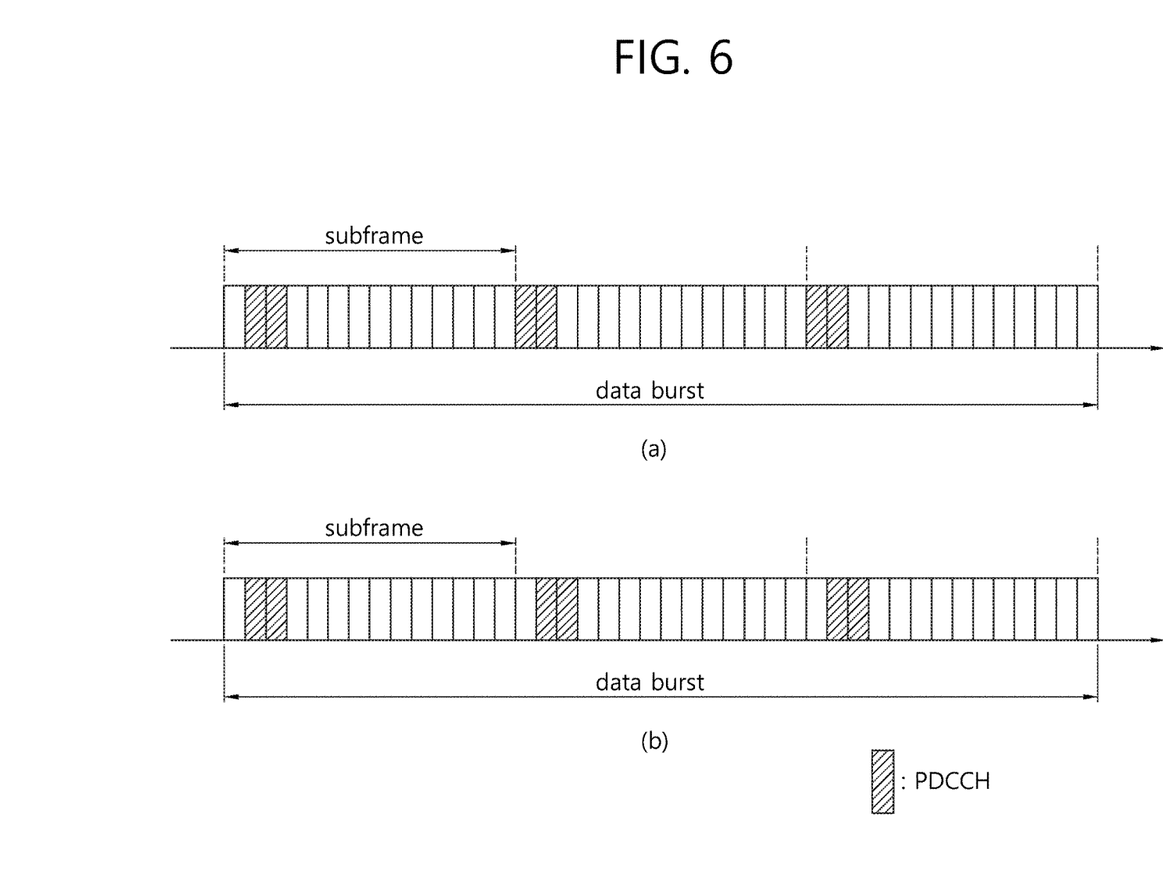
FIG. 6 shows transmission of a control channel according to an embodiment of the present invention.

FIG. 6 shows transmission of a control channel according to an embodiment of the present invention.

A PDCCH is described as an example of the control channel. Although it is considered that a subframe includes 14 OFDM symbols and a PDCCH is transmitted in 2 OFDM symbols, this is for exemplary purposes only. It is assumed that a DL data burst is transmitted in 3 consecutive subframes.

It is proposed that the DL control channel is transmitted after an $N^{th}$ OFDM symbol (N>=1) of a subframe. For example, PDCCH transmission may be transmitted starting from a $2^{nd}$ OFDM symbol or $3^{rd}$ OFDM symbol of each subframe. Herein, when the PDCCH is transmitted, it may imply that a search space for the PDCCH is defined starting from a $2^{nd}$ OFDM symbol, and the UE monitors the PDCCH in this search space.

A subfigure (a) of FIG. 6 shows that a PDCCH is transmitted starting from a $2^{nd}$ OFDM symbol in a $1^{st}$ subframe in which transmission of a data burst starts. A subfigure (b) of FIG. 6 shows that a PDCCH is transmitted starting from a $2^{nd}$ OFDM symbol in each of three subframes in which a data burst is transmitted.

An error occurring in PDCCH reception can be avoided even if AGC setting is not stable in the $1^{st}$ OFDM symbol of the subframe.

Figure 7:
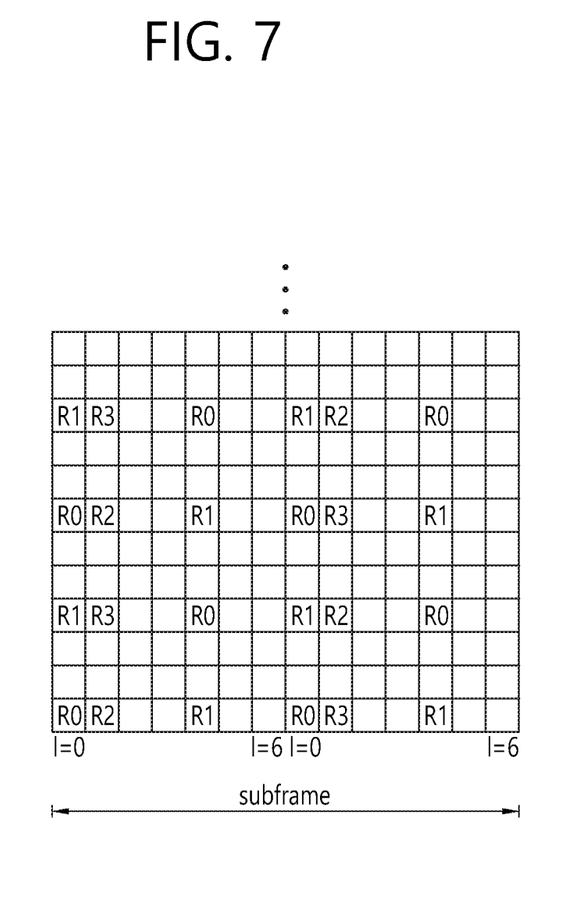
FIG. 7 shows an example in which a cell specific reference signal (CRS) is arranged in 3rd generation partnership project (3GPP) LTE.

FIG. 7 shows an example in which a cell specific reference signal (CRS) is arranged in 3GPP LTE. R0 is a CRS for an antenna port 0. R1 is a CRS for an antenna port 1. R2 is a CRS for an antenna port 2. R3 is a CRS for an antenna port 3.

Figure 8:
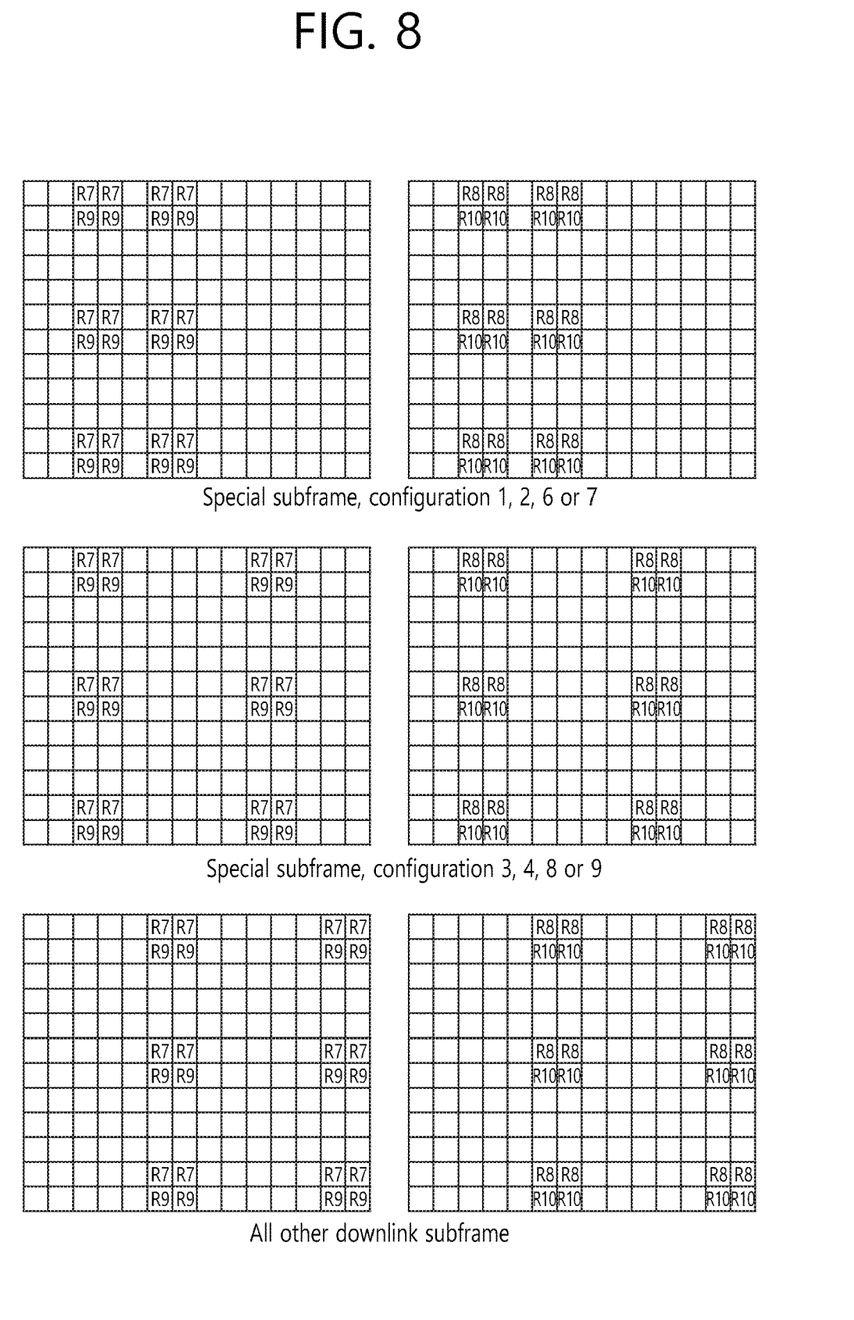
FIG. 8 shows an example in which a user equipment (UE) specific reference signal (URS) is arranged in 3GPP LTE.

FIG. 8 shows an example in which a UE specific reference signal (URS) is arranged in 3GPP LTE. R7 is a URS for an antenna port 7. R8 is a URS for an antenna port 8. R9 is a URS for an antenna port 9. R10 is a URS for an antenna port 10.

Figure 9:
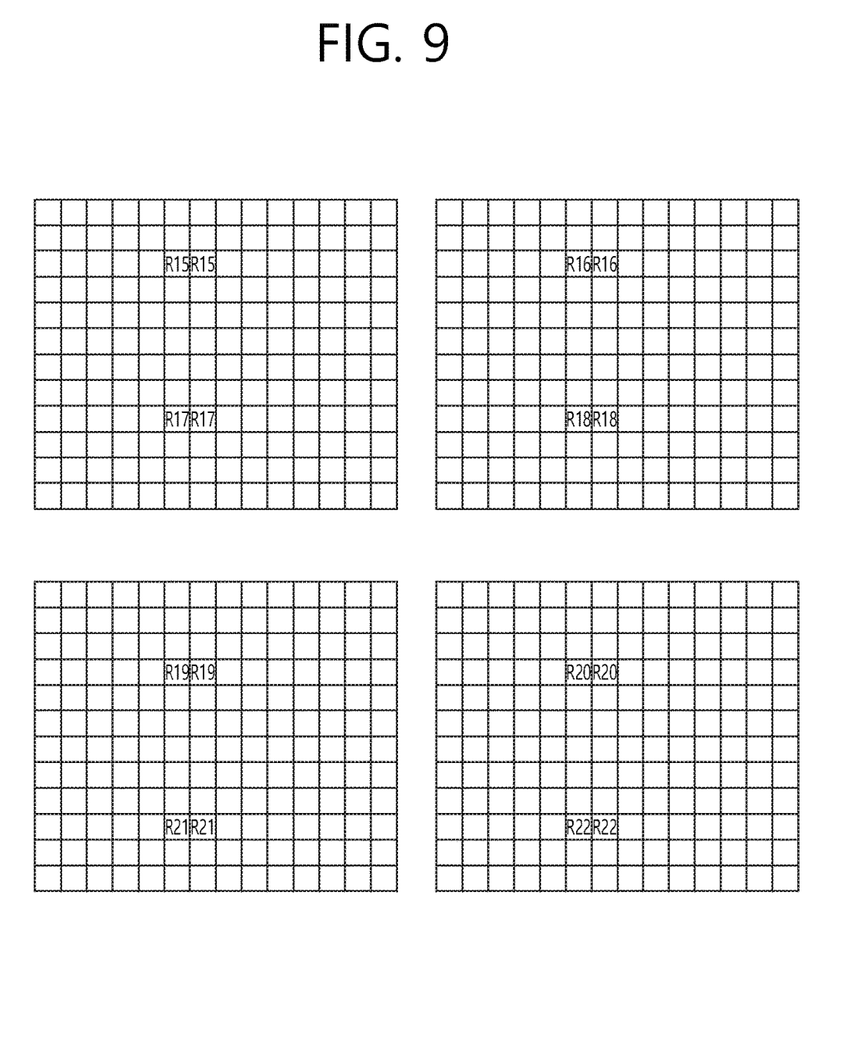
FIG. 9 shows an example in which a channel state information (CSI) reference signal (RS) is arranged in 3GPP LTE.

FIG. 9 shows an example in which a channel state information (CSI) reference signal (RS) is arranged in 3GPP LTE.

As shown in FIG. 9, a CRS is transmitted in a $1^{st}$ OFDM symbol of a subframe. According to an embodiment, it is proposed to start transmission after an $N^{th}$ symbol (N>=1) so that the CRS can be received after AGC setting is stable. Maintaining of a relative position between the CRS, a URS, and the CSI RS within the existing 3GPP LTE subframe may lead to prevention of collision between the RSs without having to increase RS reception complexity in a receiving node. Therefore, it is proposed that the URS and the CSI-RS are also transmitted by being delayed by N OFDN symbols while transmitting the CRS at a position delayed by the N OFDM symbols in comparison with the existing 3GPP LTE structure in the subframe.

Figure 10:
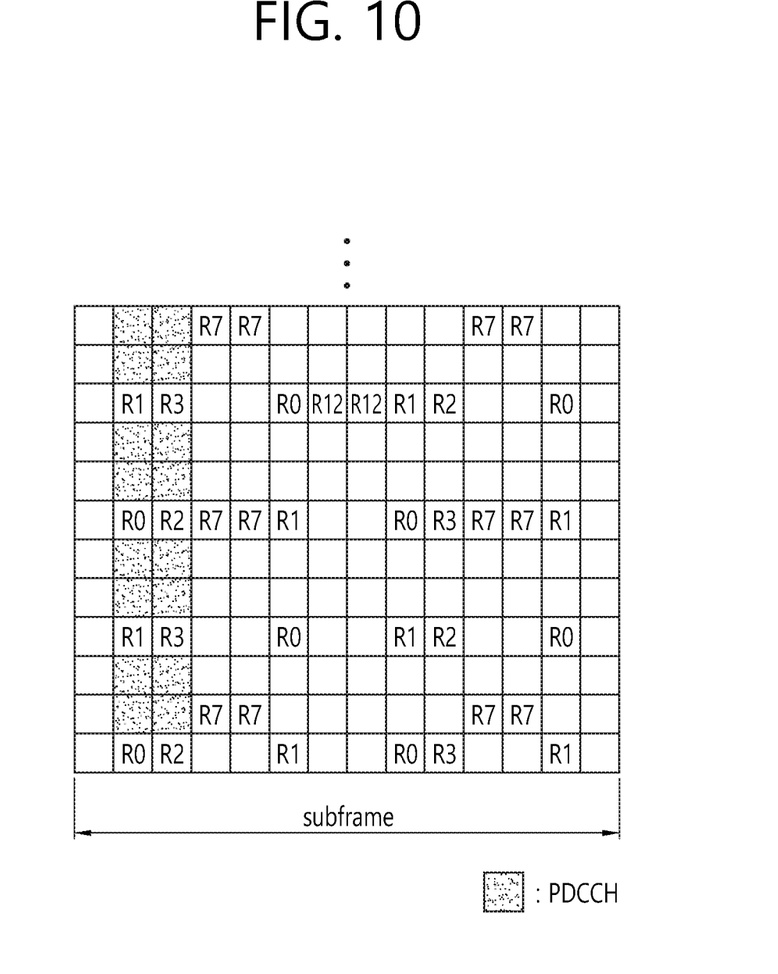
FIG. 10 shows a proposed RS structure.

FIG. 10 shows a proposed RS structure.

This is a case of N=1, and exemplifies a structure in which a PDCCH, a CRS, a URS, and a CSI RS are transmitted with a delay of one OFDM symbols in comparison with the exiting 3GPP LTE subframe structure.

As shown in FIG. 8, since the URS uses a last OFDM symbol in a subframe other than a TDD special subframe, there is a problem in that the URS cannot be entirely transmitted when transmission is delayed. Therefore, it is proposed to delay a URS structure of a special subframe by one OFDM symbol.

In order to avoid overlapping with an OFDM symbol on which the URS is transmitted, the PDCCH may be transmitted only through up to two OFDM symbols.

A structure in which RS transmission is delayed in a subframe (this is called a delayed RS/PDCCH subframe) may be used together with a structure in which PDCCH transmission is delayed or may be used alone only for an RS.

The delayed RS/PDCCH subframe may be applied only to a first subframe in which a data burst is transmitted or may be applied to all subframes.

The delayed RS/PDCCH subframe may be applied only when a signal (DRS, etc.) suitable for adjusting an AGC of a receiving node is not received within a specific time before a corresponding data burst is transmitted.

A BS may report whether the delayed RS/PDCCH subframe is applied to a certain subframe. This may be indicated through a grant in a corresponding subframe. Alternatively, whether the delayed RS/PDCCH is applied to the certain subframe may be reported through RRC signaling or MAC signaling of a primary cell.

Figure 11:
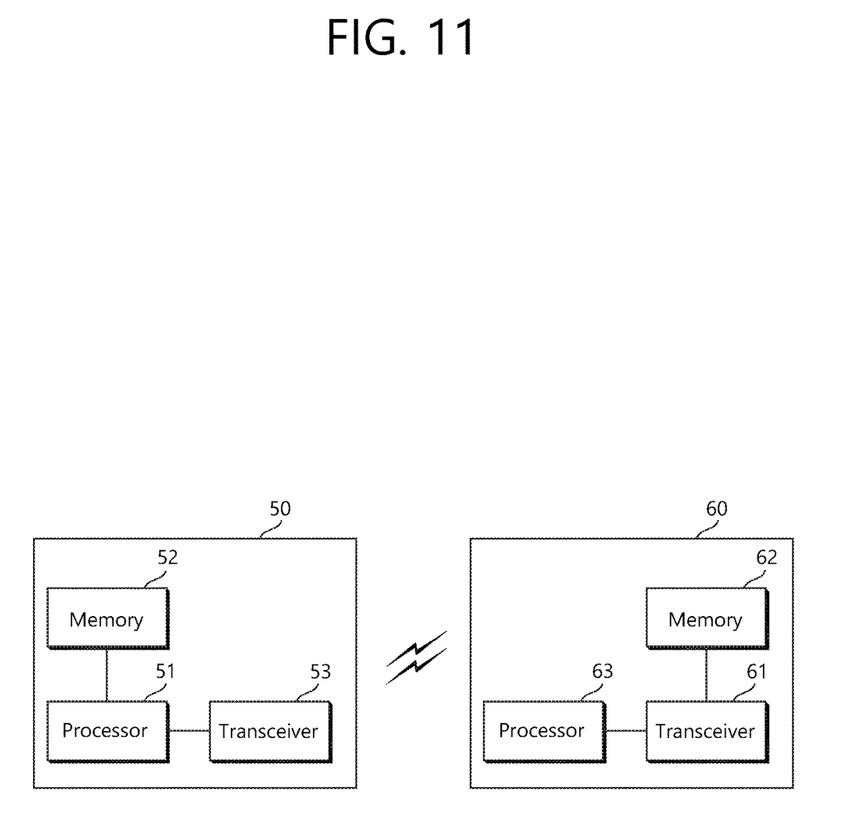
FIG. 11 is a block diagram showing a wireless communication system according to an embodiment of the present invention.

FIG. 11 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of receiving data in an unlicensed band, the method comprising:
    receiving, by a wireless device, a discovery reference signal (DRS) configuration for a DRS period from a primary cell operating in a licensed band;
    confirming, by the wireless device, whether a DRS is received in a DRS subframe of a secondary cell operating in the unlicensed band according to the DRS period;
    receiving, by the wireless device, a downlink data burst from the secondary cell; and
    determining, by the wireless device, a reception quality of the downlink data burst based on the received DRS,
    wherein the reception quality of the downlink data burst relates to a block error rate (BLER) of the downlink data burst,
    wherein when the DRS is received within a specific duration before the downlink data burst is received, the BLER of the downlink data burst is set lower than a predetermined value, and
    wherein when the DRS is not received within the specific duration before the downlink data burst is received, the BLER of the downlink data burst is set higher than the predetermined value.

2. The method of claim 1, wherein the DRS configuration comprises flag information regarding whether the reception quality of the downlink data burst is determined based on the received DRS.

3. The method of claim 1, wherein the secondary cell is activated or deactivated by the primary cell.

4. The method of claim 1, wherein the wireless device assumes that the DRS and the downlink data burst use same transmit power or are received within a specific range of transmit power.

5. The method of claim 1, wherein the DRS is used to acquire a time-frequency synchronization of the secondary cell.

6. A device for receiving data in an unlicensed band, the device comprising:
    a transceiver for transmitting and receiving a radio signal; and
    a processor operatively coupled to the transceiver and configured to:
    receive a discovery reference signal (DRS) configuration for a DRS period from a primary cell operating in a licensed band;
    confirm whether a DRS is received in a DRS subframe of a secondary cell operating in the unlicensed band according to the DRS period;
    receive a downlink data burst from the secondary cell; and
    determine a reception quality of the downlink data burst based on the received DRS,
    wherein the reception quality of the downlink data burst relates to a block error rate (BLER) of the downlink data burst,
    wherein when the DRS is received within a specific duration before the downlink data burst is received, the BLER of the downlink data burst is set lower than a predetermined value, and
    wherein when the DRS is not received within the specific duration before the downlink data burst is received, the BLER of the downlink data burst is set higher than the predetermined value.

7. The device of claim 6, wherein the DRS configuration comprises flag information regarding whether the reception quality of the downlink data burst is determined based on the received DRS.

8. The device of claim 6, wherein the secondary cell is activated or deactivated by the primary cell.

9. The device of claim 6, wherein the processor assumes that the DRS and the downlink data burst use same transmit power or are received within a specific range of transmit power.

* * * * *